July 31, 1934.  H. PLACIDE  1,968,348
NOZZLE
Filed July 27, 1932
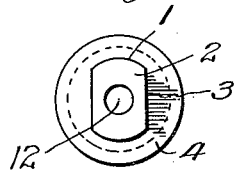
Fig.1.
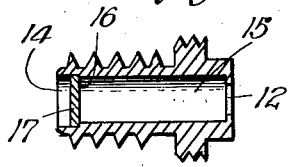
Fig.4.
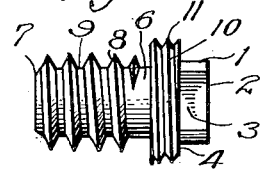
Fig.8.
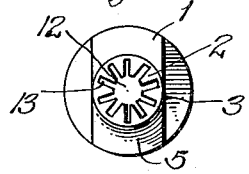
Fig.2.
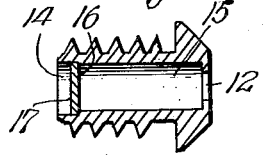
Fig.5.
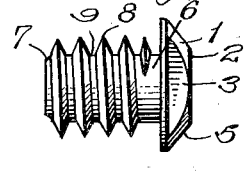
Fig.9.
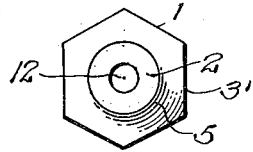
Fig.3.
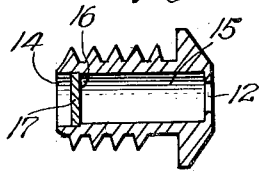
Fig.6.
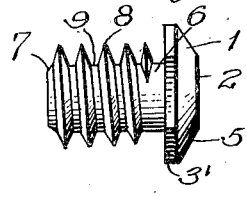
Fig.10.
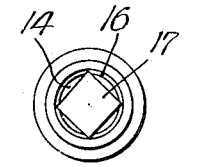
Fig.12.
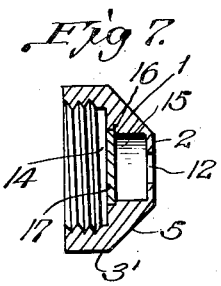
Fig.7.
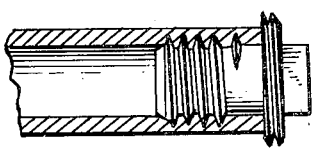
Fig.11.
Fig.13.
Henry Placide
Inventor Patented July 31, 1934

1,968,348

UNITED STATES PATENT OFFICE 1,968,348

NOZZLE

Henry Placide, Baltimore, Md.

Application July 27, 1932, Serial No. 625,033

10 Claims. (Cl. 299—107)

The invention relates generally to improvements in nozzles and makes use of novel arrangements in connection therewith by providing on the body of the nozzle a helical coupling thread, having a sharp cutting edge with the turns of the thread spaced a substantial distance apart to form flat surfaces therebetween, whereby it can be screwed into a hose and held firmly in place therein by the coupling thread being imbedded in the grooves cut thereby in the walls of the hose or other casing, and by providing on the rim of a nozzle a helical coupling thread adapted to receive a sprinkler or other attachment, and by further providing in a nozzle a fluid passage with varying dimensions along its length to provide an outlet orifice and a larger interior, with devices therein whereby a spray effect is produced in the water or other fluid ejected therefrom. These arrangements constitute new and novel methods for coupling a nozzle to a hose or to a sprinkler or other attachment, and for producing a spray effect in the water or other fluid ejected therefrom.

An object of the invention is to provide a nozzle having combined therewith a coupling device for attachment into a hose, which will eliminate the additional couplings, clamps, screws or washers necessary in the methods now generally used of attaching nozzles to hose by inserting the inner end of a hose coupling within the end of a hose casing, where secured in place by clamps applied around the outside thereof, after which the outer protruding end of the hose coupling can receive the nozzle, with a washer compressed between same to perfect a watertight joint.

Another object is to provide a nozzle having a body provided with a coupling adapted for connection to a hose and a head having a rim provided with a coupling adapted to receive a sprinkler or other attachment.

Another object is to provide a nozzle having a fluid passage with varying dimensions along its length to provide an outlet orifice and a larger interior, with devices therein whereby a spray effect is produced in the water or other fluid ejected therefrom.

Another object is to provide a nozzle with side grips whereby a secure grip can be obtained thereon by which pressure can be exerted to forcibly screw it into a casing or over a coupling.

Another object is to provide a nozzle of unusual type with length shorter than its width, provided with side grips and having a fluid passage with varying dimensions along its length to provide an outlet orifice and a larger interior, with devices therein whereby a spray effect is produced in the water or other fluid ejected therefrom.

Other objects will appear in the following description.

The drawing illustrates the preferred embodiment of my invention as reduced to practice but as conditions concurrent with use of the device will necessarily vary it is to be understood that various minor changes in detail and construction, proportion or arrangement of parts, may be resorted to when desired without forfeiting any of the advantages of my invention as described herein.

In the accompanying drawing:

Figure 1 is a face view of a nozzle.

Figure 2 is a face view of a nozzle in modified form.

Figure 3 is a face view of a nozzle in still further modified form.

Figures 4, 5 and 6 are longitudinal sections of the nozzles shown in Figures 1, 2 and 3, respectively.

Figure 7 is a longitudinal section of a nozzle adapted to be secured to a conventional hose coupling.

Figures 8, 9 and 10 are side elevations of the several forms of the nozzle.

Figure 11 is a side elevation of a nozzle shown applied to a hose.

Figure 12 is a rear view of a nozzle with the plate shown in position.

Figure 13 is a view showing different polygonal plates which may be used.

Corresponding and like parts are identified by the same reference to characters thruout the several views.

Referring to the drawing:

In Figure 1 is shown a nozzle having a head 1, with flat face 2, provided with side grips 3 and with a flat annular peripheral washer seat 4 around same, and an outlet orifice 12.

In Figure 2 is shown a nozzle having a head 1, with flat face 2, provided with side grips 3, and inclined sides 5, and an outlet orifice 12, with radially extending rectangular slots 13, whereby a spray effect is produced in the water or other fluid ejected therefrom.

In Figure 3 is shown a nozzle having a head 1, with flat face 2, provided with side grips 3' and inclined sides 5, and an outlet orifice 12.

In Figures 4, 5 and 6, are shown nozzles with heads of different types as shown correspondingly in Figures 1, 2 and 3, having a fluid passage 14 with varying dimensions along its length to provide an outlet orifice 12 and a larger interior 15 with a shoulder 16 therein for a plate 17 disposed thereon, with portions spaced from the wall of the passage whereby separate streams of water or other fluid are created which when meeting cause centrifugal motion at the outlet orifice whereby a spray effect is produced in the water or other fluid ejected therefrom. The sides of the body may be of uniform diameter as shown or tapered down to a smaller end.

In Figure 7 is shown a nozzle with head 1, of the type as shown in Figure 3, with flat face 2, provided with side grips 3', and inclined sides 5, having a fluid passage 14 with varying dimensions along its length to provide an outlet orifice 12 and a larger interior 15 with a shoulder 16 therein for a plate 17 disposed thereon, with portions spaced from the wall of the passage whereby separate streams of water or other fluid are created which when meeting cause centrifugal motion at the outlet orifice whereby a spray effect is produced in the water or other fluid ejected therefrom.

In Figure 8 is shown a nozzle having a head 1, with a flat face 2, provided with side grips 3, and with a flat annular peripheral washer seat 4 around same, a rim 10 with a helical coupling thread 11 thereon adapted to receive a sprinkler or other attachment, and a body 6 terminating in a tapered end 7 and carrying thereon a helical coupling thread 8, having a sharp cutting edge with the turns of the thread spaced a substantial distance apart to form flat surfaces 9 therebetween, whereby it can be screwed into a hose and held firmly in place therein by the coupling thread being imbedded in the grooves cut thereby in the walls of the hose casing.

In Figures 9 and 10 are shown nozzles with heads of different types as shown correspondingly in Figures 2 and 3, having a head 1, with a flat face 2, provided with side grips 3 or 3', and inclined sides 5, and a body 6 terminating in a tapered end 7 and carrying thereon a helical coupling thread 8, having a sharp cutting edge with turns of the thread spaced a substantial distance apart to form flat surfaces 9 therebetween, whereby it can be screwed into a hose and held firmly in place therein by the coupling thread being imbedded in the grooves cut thereby in the walls of the hose casing.

In Figure 11 is shown a nozzle inserted into a hose.

In Figure 12 is shown a nozzle having a fluid passage 14 with a shoulder 16 therein for a plate 17 disposed thereon, which is held securely in place by the edges of said plate being pressed into the walls of said fluid passage, said plate having a slightly larger diameter than said passage.

In Figure 13 is shown a nozzle plate 17, made square, or triangular, or round with nozzle holes therein.

I claim:

1. A nozzle having a circular fluid passage with varying dimensions along its length to provide an outlet orifice and a larger interior, with a shoulder therein, and a polygonal flat solid nozzle plate disposed thereon and having its angles bearing against the wall of said passage.

2. In a nozzle having a circular fluid passage with varying dimensions along its length to provide an outlet orifice and a larger interior, with a shoulder therein for supporting a nozzle plate disposed thereon, a polygonal flat solid nozzle plate disposed thereon and against the side of the wall of said passage in permanent position by pressure of its corner edges into and against said wall.

3. In a nozzle having a circular fluid passage with varying dimensions along its length to provide an outlet orifice and a larger interior, a polygonal flat solid nozzle plate having its greatest transverse dimensions somewhat greater than the diameter of said fluid passage, said plate being positioned transversely of said fluid passage with its corners slightly penetrating the wall of said fluid passage, whereby said plate is held securely in place.

4. A nozzle having a circular fluid passage with varying dimensions along its length to provide an outlet orifice and a larger interior, with a shoulder therein, and a polygonal deflector member disposed thereon and having some of its angles bearing against the wall of said passage.

5. In a nozzle having a circular fluid passage with varying dimensions along its length to provide an outlet orifice and a larger interior, with a shoulder therein, a polygonal deflector member disposed on said shoulder and against the side of the wall of said passage in permanent position by pressure of some of its corner edges into and against said wall.

6. In a nozzle having a circular fluid passage with varying dimensions along its length to provide an outlet orifice and a larger interior, a polygonal deflector member having its greatest transverse dimensions somewhat greater than the diameter of said fluid passage, said member being positioned transversely of said fluid passage with some of its corners slightly penetrating the wall of said fluid passage, whereby said plate is held securely in place.

7. A nozzle having a circular fluid passage with varying dimensions along its length to provide an outlet orifice and a larger interior, with a shoulder therein, and disposed thereon a polygonal deflector member having its greatest transverse dimensions somewhat greater than the diameter of said fluid passage, said member being positioned transversely of said fluid passage with its angles slightly penetrating the wall of said fluid passage.

8. A nozzle having a circular fluid passage with varying dimensions along its length to provide an outlet orifice and a larger interior, with a shoulder therein, and a triangular flat solid nozzle plate disposed thereon and having its angles bearing against the wall of said passage.

9. In a nozzle having a circular fluid passage with varying dimensions along its length to provide an outlet orifice and a larger interior, with a shoulder therein for supporting a nozzle plate disposed thereon, a triangular nozzle plate disposed on said shoulder and against the side of the wall of said passage in permanent position by pressure of its corner edges into and against said wall.

10. In a nozzle having a circular fluid passage with varying dimensions along its length to provide an outlet orifice and a larger interior, a triangular flat solid nozzle plate having its greatest transverse dimensions somewhat greater than the diameter of said fluid passage, said plate being positioned transversely of said fluid passage, with its corners slightly penetrating the wall of said fluid passage, whereby said plate is held securely in place.

HENRY PLACIDE.